United States Patent Office 3,494,917
Patented Feb. 10, 1970

3,494,917
SYNTHETIC PENICILLINS AND PROCESS FOR
THEIR PREPARATION
Daniel Bertin, Montrouge, and Andre Pierdet, Noisy-le-sec, France, assignors to Roussel Uclaf, Paris, France, a corporation of France
No Drawing. Filed Mar. 26, 1968, Ser. No. 715,981
Claims priority, application France, Mar. 29, 1967,
100,617; Jan. 31, 1968, 138,141
Int. Cl. C07d 99/16; A61k 21/00
U.S. Cl. 260—239.1                  10 Claims

ABSTRACT OF THE DISCLOSURE

The invention relates to new derivatives of 6-amino penicillanic acid of general Formula I

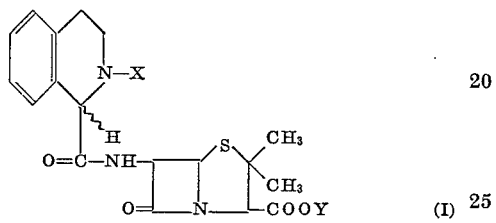

in which X represents hydrogen, an alkyl, alkenyl, aryl, aralkyl or aralkyloxycarbonyl radical, as well as substituted radicals, Y represents hydrogen or the monovalent radical of a therapeutically-compatible mineral or organic base, the wavy line indicating a dextrorotatory or levorotatory configuration at 1' or the mixture of the 2 stereoisomers.

The new penicillins of general Formula I are endowed with interesting pharmacological properties. In addition to the antibacterial properties of the classic penicillins such as penicillin G, these new penicillins possess, in fact, an outstanding activity against the bacteria known as "penicillin-resistant," that is to say, against bacterial which secrete penicillinase.

Claim of priority

Under the previsions of 35 USC 119, the right of priority is hereby claimed, based on the corresponding French patent applications 100,617, filed Mar. 29, 1967 and 138,141, filed Jan. 31, 1968, on our behalf.

Objects of the invention

An object of this invention is the obtention of a N-substituted 6-aminopenicillanic acid having the formula

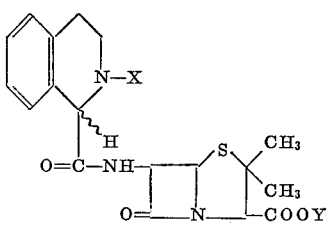

wherein X is selected from the group consisting of hydrogen, alkyl, fluoroalkyl, alkenyl, aryl, aralkyl and aralkyloxycarbonyl, Y is selected from the group consisting of hydrogen, the monovalent residue of a therapeutically-compatible mineral base and the monovalent residue of a therapeutically-compatible organic base and the wavy line at the 1' position represents a steric configuration selected from the group consisting of the dextrorotatory isomer, the levorotatory isomer and mixtures thereof.

A further object of the invention is the development of a process for the production of the above N-substituted 6-aminopenicillanic acids which comprises the steps of reacting a lower alkyl chloroformate with a tetrahydro-isoquinaldinic acid having the formula

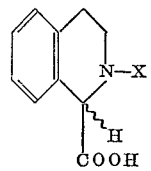

wherein X is selected from the group consisting of hydrogen, alkyl, fluoroalkyl, alkenyl, aryl, aralkyl and aralkyloxycarbonyl, and the wavy line at the 1 position represents a steric configuration selected from the group consisting of the dextrorotatory isomer, the levorotatory isomer and mixtures thereof, in the presence of a basic agent, condensing the resultant mixed anhydride having the formula

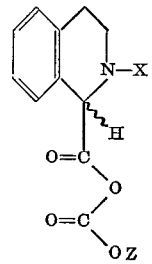

wherein X and the wavy line have the above-assigned values and Z represents a lower alkyl, with 6-aminopenicillanic acid, in the presence of a weakly alkaline medium, and recovering said N-substituted 6-aminopenicillanic acid.

A yet further object of the present invention is the development, as a variant, of a process for the production of a 6-(1',2',3',4' - tetrahydroisoquinolyl - 1' - carbonyl)-aminopenicillanic acid having the formula

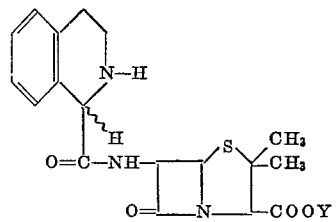

wherein Y is selected from the group consisting of hydrogen, the monovalent residue of a therapeutically-compatible mineral base and the monovalent residue of a therapeutically-compatible organic base and the wavy line at the 1' position represents a steric configuration selected from the group consisting of the dextrorotatory isomer, the levorotatory isomer and mixtures thereof, which comprises the steps of condensing 1,2,3,4-tetrahydroisoquinaldinic acid having the formula

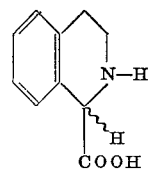

wherein the wavy line has the above-assigned values, with carbon oxychloride, reacting the resulting internal anhydride of the formula

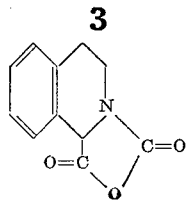

with 6-aminopenicillanic acid in the presence of a weakly acid medium, and recovering said 6-(1',2',3',4' - tetrahydroisoquinolyl-1' - carbonyl) - aminopenicillanic acid.

Another object of the invention is the obtention of novel intermediates:

A mixed anhydride having the formula

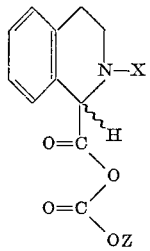

wherein X is selected from the group consisting of hydrogen, alkyl, fluoroalkyl, alkenyl, aryl, aralkyl and aralkyloxycarbonyl, and the wavy line at the 1 position represents a steric configuration selected from the group consisting of the dextrorotatory isomer, the levorotatory isomer and mixtures thereof, and Z represents a lower alkyl. A still further object of the present invention is the development of a process for the treatment of bacilliary infections in warm-blooded animals which comprises administering to the infected warm-blooded animal from 10 mg./kg. to 100 mg./kg. per day of the above N-substituted 6-aminopenicillanic acid.

These and other objects of the invention will become more apparent as the description thereof proceeds.

Description of the invention

The invention involves a new class of N-substituted 6-aminopenicillanic acids having the formula

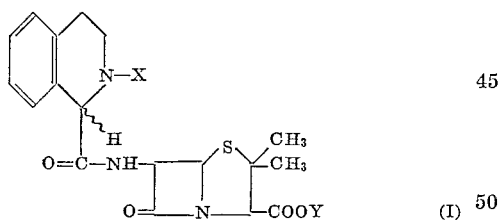

in which X represents hydrogen, an alkyl, alkenyl, aryl, aralkyl or aralkyloxycarbonyl radical, as well as substituted radicals, Y represents hydrogen or the monovalent radical of a therapeutically-compatible mineral or organic base, the wavy line indicating a dextrorotatory or levorotatory configuration at 1' or the mixture of the two stereoisomers.

The new penicillins of general Formula I are endowed with interesting pharmacological properties. In addition to the antibacterial properties of the classic penicillins such as penicillin G, these new penicillins possess, in fact, an outstanding activity against the bacteria known as "penicillin-resistant," that is to say, against bacteria which secrete penicillinase.

Thus, 6 - (dl - N - benzyl - 1',2',3',4' - tetrahydroisoquinolyl-1'-carbonyl) - aminopenicillanic acid proves twice as active at the end of 24 hours and at least ten times as active at the end of 48 hours as the potassium salt of penicillin G on a selected strain of staphylococci producing penicillinase. The new products reveal, moreover, a great stability in acid medium.

Thus, 6 - (dl - N - benzyl - 1',2',3',4' - tetrahydroisoquinolyl - 1' - carbonyl) - aminopenicillanic acid is after one hour in aqueous solution, at pH 2, twice as active as the potassium salt of penicillin G on a staphylococcus.

Finally, the N-methyl and N-allyl derivatives are likewise more active than penicillin G.

The process for preparing the new penicillins of general Formula I likewise forms the object of the present invention.

It has been established that the classic processes for acylating the amine function of 6-aminopenicillanic acid by the carboxylic group of the N-substituted 1,2,3,4-tetrahydroisoquinaldinic acids, such as, for example, the action of the 1,2,3,4-tetrahydroisoquinaldinic acid chlorides on aminopenicillanic acid, do not give satisfactory results, apparently because of the instability in acid medium of the thiazolidinic part of the molecule. To resolve this difficulty, a process has been perfected allowing, by the intermediary of mixed anhydrides of a lower alkyl carbonate and of tetrahydroisoquinaldinic acid, the access to the desired compounds of general Formula I.

This process for preparing the compounds I, an object of the invention, is illustrated by the flow diagram A.

FLOW DIAGRAM A

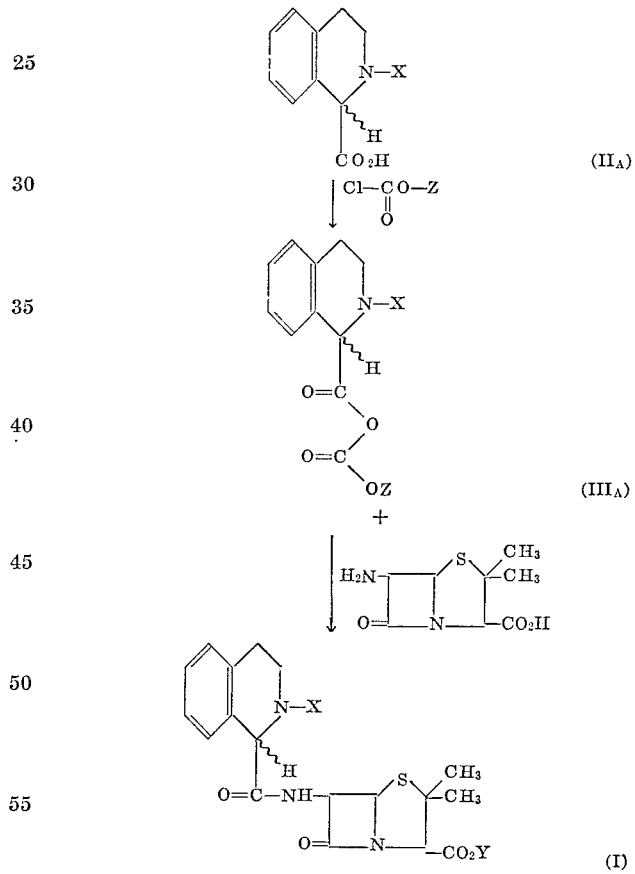

With Z=lower alkyl radical, X, Y and the wavy line have the above-indicated meanings.

The process is essentially characterized in that a lower alkyl chloroformate is caused to act in the presence of a basic agent on an N-substituted 1,2,3,4-tetrahydroisoquinaldinic acid, optically-active or racemic, II$_A$, then, the resulting mixed anhydride of lower alkyl carbonate and of N-substituted 1,2,3,4-tetrahydroisoquinaldinic acid, III$_A$, is condensed in weakly alkaline medium with 6-aminopenicillanic acid and the desired N-substituted 6-(d-, 1-, or dl-1', 2', 3', 4'-tetrahydroisoquinolyl-1'-carbonyl)-aminopenicillanic acid is obtained which is salified, if desired, with a therapeutically-compatible mineral or organic base.

The flow Diagram B illustrates a variant of the above process, likewise an object of the invention, which is applied in the case where it is desired to obtain 6-(d-, 1-, or dl-1', 2', 3', 4'-tetrahydroisoquinolyl 1'-carbonyl)-amino penicillanic acid, that is to say, a compound of Formula I substituted at the nitrogen by a hydrogen atom (X=H).

FLOW DIAGRAM B

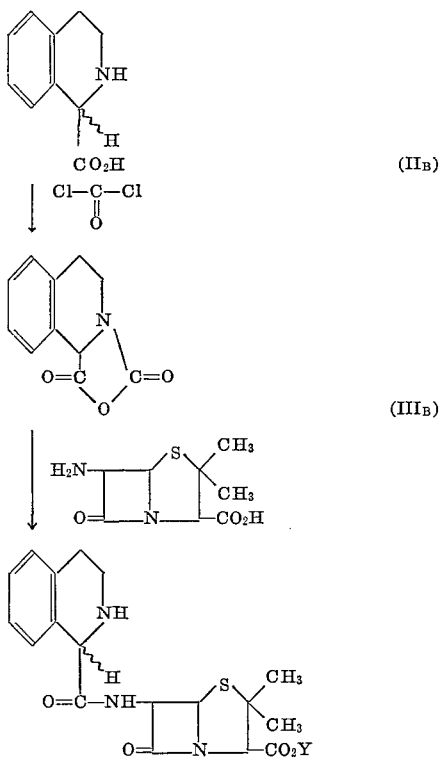

I with X=H, Y and the wavy line have the above-indicated meanings.

This process varies from the above process in that, at the onset 1,2,3,4-tetrahydroisoquinaldinic acid, optically active or racemic, $II_B$, is condensed with carbon oxychloride; the internal anhydride of N-carboxy-1,2,3,4-tetrahydroisoquinaldinic acid, $III_B$, is obtained, which is reacted in weakly acid medium with 6-aminopenicillanic acid, and 6-(d-, 1-, or dl-1', 2', 3', 4'-tetrahydroisoquinolyl-1'-carbonyl)-aminopenicillanic acid (I, with X=H and Y=H) is isolated and which is then possibly salified.

In their methods of performance, the process of the invention and its variant can be further characterized by the following points:

(a) The lower alkyl chloroformate used for the condensation with the N-substituted 1,2,3,4-tetrahydroisoquinaldinic acid $II_A$ is preferably ethyl or methyl chloroformate.

(b) The basic agent in the presence of which this condensation is effected is preferably a tertiary base such as a trialkylamine.

(c) This preparation of the mixed anhydride $III_A$ is conveniently effected in a polar solvent, such as acetone.

(d) In the case where it is desired to obtain 1'-(1', 2', 3', 4'-tetrahydroisoquinolyl)-penicillin (I with X=H), the carbon oxychloride (phosgene) which is condensed with 1,2,3,4-tetrahydroisoquinaldinic acid $II_B$ is reacted preferentially in solution in an aprotic solvent such as benzene or toluene. This condensation is, moreover, advantageously effected in the presence of a solvent capable of solubilizing 1,2,3,4-tetrahydroisoquinaldinic acid such as dioxan for example.

(e) To effect the condensation of the mixed anhydride $III_A$ with 6-aminopenicillanic acid, it is convenient to use the solution or the suspension of this anhydride obtained by condensation of N-substituted tetrahydroisoquinaldinic acid with alkyl chloroformate, without proceeding to the intermediate isolation of the anhydride.

(f) The condensation of the mixed anhydride $III_A$ with 6-aminopenicillanic acid is conveniently effected in aqueous solution, in the presence of an excess of a weak base, such as sodium bicarbonate.

(g) The condensation of the internal anhydride $III_B$, which is preferably isolated from the reaction medium, for example, by distillation under reduced pressure, with 6-aminopenicillanic acid is advantageously effected at a weakly acid pH, the reaction medium being brought to and then maintained at this pH by adding a dilute strong base such as sodium hydroxide or potassium hydroxide as required.

(h) The possible salification of the acid penicillins of Formula I (Y=H) is effected by the classic means. One uses, for example, either dilute mineral bases or the mineral salts of strong bases and of weak acids, or organic bases, or else the salts of strong organic bases and of weak acids.

(i) When the final pH, during the isolation of the compounds I, is sufficiently high, the penicillin salts can be obtained directly (alkali metal salts, for example).

The starting N-substituted 1,2,3,4-tetrahydroisoquinaldinic acids can be obtained from the known dl-N-benzyl-1,2,3,4-tetrahydroisoquinaldinic acid by hydrogenation to obtain dl-1,2,3,4-tetrahydroisoquinaldinic acid. This latter compound is reacted for example directly with an aralkyl chloroformate, preferably a phenyl-lower-alkyl chloroformate, such as benzyl or phenylethyl chloroformate to give compound $II_A$ where X=aralkyloxycarbonyl.

Also, the dl-1,2,3,4-tetrahydroisoquinaldinic acid can be esterified by conventional processes with a lower alkanol, such as methanol or ethanol, and the lower alkyl ester of dl-1,2,3,4-tetrahydroisoquinaldineic acid is then reacted with a compound of the formula X=halide where X has the above-assigned values, except hydrogen, and the halide is preferably the iodide or bromide, to obtain the N-substituted compound in the form of its lower alkyl ester. The ester group is then saponified to give the free acid.

Any of the above dl-acids can be resolved by use of an optically-active base to give the dextrorotatory and levorotatory acids which also undergo the condensations of flow diagrams A and B.

Among the X-halide compounds which are condensed with the nitrogen of 1,2,3,4-tetrahydroisoquinaldinic acid, lower alkyl ester, are, for example, alkyl halides, preferably lower alkyl iodides, such as methyl iodide, ethyl iodide, etc.; alkenyl halides, preferably lower alkenyl bromides, such as allyl bromide, etc.; aryl halides, preferably phenyl iodide, etc.; aralkyl halides preferably phenyl-lower-alkyl iodides, such as phenylethyl iodide, etc.; and haloalkyl halides, preferably fluoro-lower-alkyl iodides, such as trifluoroethyl iodide, etc.

As has been indicated above, the new penicillins of General Formula I are endowed with interesting phormacological properties.

They can be used in the warm-blooded animals for the treatment of staphylococcal infections, such as staphylococcal septicemias, malignant staphylococcosis of the face, cutaneous staphylococcosis, pyodermatitis, septic or suppurating sores, anthrax, phlegmons, primary or post-influenzal acute staphylococcosis, bronchopneumonias and pulmonary suppurations.

They can be used by buccal route, transcutaneous route, or by local route in topical application on the skin and mucosa.

They can be presented in the form of injectable solutions, injectable suspensions, dispensed in ampules, in the form of tablets, coated tablets, aromatized powders, granules, syrups, suppositories, ovules, intravaginal tablets, ointments, creams, eye-washes, nose or ear drops, mouth washes and topical powders as pulverizations.

The useful dosage lies between 250 mg. and 1 gm. per dose and 1 to 5 gm. per day in the adult depending on the route of administration. The pharmaceutical forms such as injectable solutions or suspensions, tablets, coated tablets, aromatized powder, granules, syrups, suppositories, ovules, intravaginal tablets, ointments, creams, eyewashes, nose or ear drops, mouth washes and topical powders, are prepared according to the usual processes.

The following examples illustrate the invention without however being deemed limitative in any respect.

EXAMPLE I

6 - (dl - N - benzyl - 1',2',3',4' - tetrahydroisoquinolyl-1'-carbonyl)-aminopenicillanic acid (I, with X=benzyl and Y=H)

(A) FORMATION OF THE MIXED ANHYDRIDE OF ETHYL CARBONATE AND OF dl-N-BENZYL-1,2,3,4-TETRAHYDROISOQUINALDINIC ACID (IIIA, WITH X=BENZYL AND Z=ETHYL)

Under an atmosphere of nitrogen, 0.83 cc. of triethylamine, then 1.34 gm. of dl-N-benzyl-1,2,3,4-tetrahydroisoquinaldinic acid (described by Elliot et al., J. Org. Chem. [1963], 3,181) were introduced into 84 cc. of acetone. The reaction medium was brought to 0° C. 0.48 cc. of ethyl chloroformate was added at one time and the mixture was agitated for 10 minutes. A suspension of the mixed anhydride of ethyl carbonate and of dl-N-benzyl-1,2,3,4-tetrahydroisoquinaldinic acid was obtained, which one uses as such in the following stage.

As far as is known, this product is not described in the literature.

(B) CONDENSATION OF THE MIXED ANHYDRIDE WITH 6-AMINOPENICILLANIC ACID

The suspension of mixed anhydride previously obtained in Step A was cooled to −50° C. A solution, cooled to 0° C., of 1.3 gm. of 6-aminopenicillanic acid dissolved in 42 cc. of aqueous solution containing 3 gm. per 100 cc. of sodium bicarbonate was added thereto rapidly. The reaction medium was agitated for 30 minutes at 0° C., then 30 minutes at ambient temperature.

Thereafter, the reaction solution was extracted with ethyl ether. The aqueous alkali phase was cooled and brought to a pH of 2 by adding a dilute aqueous solution of hydrochloric acid thereto. A precipitate was formed. The reaction mixture was extracted very rapidly in the cold with ethyl ether. The ethereal extracts were combined and the organic solution thus obtained was washed with water, dried and concentrated to dryness under reduced pressure.

The residue was dissolved in ethanol and the ethanolic solution was concentrated to dryness. After drying, 1.53 gm. of 6-(dl-N-benzyl-1',2',3',4'-tetrahydroisoquinolyl-1'-carbonyl)-aminopenicillanic acid was obtained.

6 - (dl-N-benzyl-1',2',3',4'-tetrahydroisoquinolyl - 1'-carbonyl)-aminopenicillanic acid occurred in the form of a solid, pinkish-white product, soluble in chloroform and alcohol, little soluble in water and decomposed on heating between 120° and 200° C.

Its rotatory power was $[\alpha]_D^{20} = +151°$ (c.=1% in chloroform.)

Circular dichroism curve (solvent:ethanol).

$\Delta\epsilon = +0.08$ at 315–320 m$\mu$.
$\Delta\epsilon = -0.03$ at 275 m$\mu$.
$\Delta\epsilon = +5.52$ at 235 m$\mu$.

It was slightly solvated with water (1.8 gm. per 100 gm.).

Analysis.—$C_{25}H_{27}N_3O_4S$; molecular weight=465.55 +1.8% water. Calculated: C, 63.3%; H, 5.95%; S, 6.75%. Found: C, 63.1%; H, 6.1%; S, 6.8 to 7.0%.

As far as is known, this product is not described in the literature.

EXAMPLE II

6 - (dl - N - benzyloxycarbonyl - 1',2',3',4', - tetrahydroisoquinolyl - 1' - carbonyl) - aminopenicillanic acid (I, with X=COOCH$_2$—C$_6$H$_5$ and Y=H)

(A) FORMATION OF THE MIXED ANHYDRIDE OF ETHYL CARBONATE AND dl-N-BENZYLOXYCARBONYL-1,2,3,4-TETRAHYDROISOQUINALDINIC ACID (IIIA, WITH X=BENZYLOXYCARBONYL AND Z=ETHYL

Into 85 cc. of acetone, 1.5 gm. of dl-N-benzyloxycarbonyl-1,2,3,4-tetrahydroisoquinaldinic acid was introduced. 0.81 cc. of triethylamine was added and the reaction solution was brought to 0° C. 0.48 cc. of ethyl chloroformate was introduced rapidly thereto and the mixture was agitated for 10 minutes at 0° C. A solution of the mixed anhydride of ethyl carbonate and dl-N-benzyloxycarbonyl-1,2,3,4-tetrahydroisoquinaldinic acid was obtained and used as such in the next step.

As far as is known, this product is not described in the literature.

(B) CONDENSATION OF THE MIXED ANHYDRIDE WITH 6-AMINOPENICILLANIC ACID

The solution of mixed anhydride, previously obtained in Step A, was cooled to −50° C. A solution, cooled to 0° C., of 1.3 gm. of 6-aminopenicillanic acid in 42 cc. of an aqueous solution containing 3 gm. per 100 cc. of sodium bicarbonate was added thereto rapidly. The mixture was agitated for 30 minutes at 0° C., then for 30 minutes at ambient temperature.

The mixture was extracted with ethyl ether. The aqueous alkali phase was cooled and acidified to a pH of 2 by adding a dilute aqueous solution of hydrochloric acid thereto. A precipitate was formed. The suspension was extracted with ethyl ether. The organic solution thus obtained was washed with water, concentrated to dryness under reduced pressure and 2.22 gm. of 6-(dl-N-benzyloxycarbonyl - 1',2',3',4' - tetrahydroisoquinolyl - 1' - carbonyl)-aminopenicillanic acid was obtained.

6 - (dl - N - benzyloxycarbonyl - 1',2',3',4'-tetrahydroisoquinolyl-1'-carbonyl)-aminopenicillanic acid occurred in the form of a solid colorless compound, soluble in water.

As far as is known, this product is not described in the literature.

The starting product, dl-N-benzyloxycarbonyl - 1,2,3,4-tetrahydroisoquinaldinic acid, can be prepared as follows.

Stage 1.—dl-1,2,3,4-tetrahydroisoquinaldinic acid.—In a hydrogenation vessel, while warming, 5 gm. of dl-N-benzyl-1,2,3,4-tetrahydroisoquinaldinic acid (described by Elliot et al., J. Org. Chem. [1963], 3181) were dissolved in 600 cc. of ethanol containing 10% water by volume. The solution was brought to ambient temperature. 5 gm. of palladinized charcoal containing 5% palladium was added. The vessel was purged. Then the mixture was agitated under an atmosphere of hydrogen until the end of absorption, which took about an hour. The catalyst was eliminated by filtering. The filtrate was concentrated to dryness under reduced pressure. The residue was purified by a crystallization in aqueous alcohol and 2.35 gm. of dl-1,2,3,4-tetrahydroisoquinaldinic acid was obtained having a melting point of 299° C.

Analysis.—$C_{10}H_{11}NO_2$; molecular weight=177.198. Calculated: C, 67.8%; H, 6.3%; N, 7.9%. Found: C, 67.7%; H, 6.1%; N, 8.2%.

This product is identical with that obtained in a different manner by Solomon, J. Chem. Soc. [1947], 129.

Stage 2.—dl - N-benzyloxycarbonyl-1,2,3,4-tetrahydroisoquinaldinic acid.—2.2 gm. of dl-1,2,3,4-tetrahydroisoquinaldinic acid were dissolved in 12.5 cc. of a normal aqueous solution of sodium hydroxide. The solution was brought to 0° C. Then slowly, 3.45 cc. of benzyl chloroformate were introduced while maintaining the pH of the reaction medium between 8 and 9 by addition of a normal aqueous solution of sodium hydroxide. The mixture was agitated for a further 2 hours under the same conditions. The reaction medium was then extracted with ethyl ether. Then it was acidified to a pH of 2 by adding a dilute aqueous solution of hydrochloric acid thereto. The acidified mixture was extracted with ethyl ether. The extracts were washed with salt water, then concentrated to dryness under reduced pressure. 1.5 gm. of dl-N-benzyloxycarbonyl-1,2,3,4-tetrahydroisoquinaldinic acid were obtained.

Infrared spectrum.—Presence of

absorption at 1700 cm.$^{-1}$. Presence of

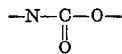

absorption at 1724 cm.$^{-1}$.

As far as is known, this product is not described in the literature.

EXAMPLE III

Sodium salt of 6-(dl-1',2',3',4'-tetrahydroisoquinolyl-1'-carbonyl)-aminopenicillanic acid (I, with X=H and Y=Na)

(A) OBTAINING THE INTERNAL ANHYDRIDE OF N-CARBOXY-1,2,3,4-TETRAHYDROISOQUINALDINIC ACID (III$_B$)

708 mg. of dl-1,2,3,4-tetrahydroisoquinaldinic acid were introduced, under an atmosphere of nitrogen, into 16 cc. of dioxan. The temperature of the reaction medium was brought to 50° C. 4 cc. of a toluene solution containing 20 gm. per 100 cc. of carbon oxychloride were added gradually. The mixture was agitated for 4 hours at 50° C. Then the reaction solution was concentrated to dryness under reduced pressure. The internal anhydride of N-carboxy-1,2,3,4-tetrahydroisoquinaldinic acid thus obtained is used as such for the condensation with 6-aminopenicillanic acid.

(B) CONDENSATION WITH 6-AMINOPENICILLANIC ACID 560 mg. of 6-aminopenicillanic acid were introduced into 24 cc. of water. The suspension thus obtained was cooled to 0° C. and its pH was brought to 5.2 by adding a decinormal aqueous solution of sodium hydroxide. Over a period of about one hour, at 0° C., the internal anhydride of N-carboxy-1,2,3,4-tetrahydroisoquinaldinic acid in solution in 12 cc. of acetone were introduced therein while maintaining the pH of the reaction medium between 4.8 and 5.2 by simultaneous addition of a decinormal aqueous solution of sodium hydroxide. The reaction mixture was agitated for 3 hours. Thereafter, the slight insoluble matter present was eliminated by filtering. Then the mixture was concentrated to dryness under reduced pressure. After hydroalcoholic purifications, 530 mg. of the sodium salt of 6-(dl-1',2',3',4'-tetrahydroisoquinolyl-1'-carbonyl)-aminopenicillanic acid was obtained, melting at about 173° C. with decomposition.

A sample of this product was crystallized from a mixture of ethanol and ether to give a product having a melting point of about 180° C. with decomposition.

This product is soluble in water, slightly soluble in chloroform and alcohol and insoluble in ether.

Analysis.—$C_{18}H_{20}O_4N_3SNa$; molecular weight=397.42. Calculated: C, 54.40%; H, 5.06%; N, 10.57%; S, 8.0%. Found: C, 54.6%; H, 5.4%; N, 10.3%; S, 7.8%.

As far as is known, this product is not described in the literature.

EXAMPLE IV

6 - (1(—)N - benzyl-1',2',3',4'-tetrahydroisoquinolyl-1'-carbonyl) - aminopenicillanic acid (I, with X=benzyl and Y=H)

Operating according to Example I, starting with 1(—)N - benzyl - 1,2,3,4 - tetrahydroisoquinaldinic acid (melting point=218° C., specific rotation $[\alpha]_D^{20}=-130°$ [c.=0.5% in pyridine])

6 - (1(—)N-benzyl - 1',2',3',4' - tetrahydroisoquinolyl-1'-carbonyl)-aminopenicillanic acid was obtained.

Its rotatory power:

$[\alpha]_D^{20}=+149°$ (c.=1% in chloroform)
$[\alpha]_D^{20}=+130°$ (c.=1% in 3% aqueous solution of sodium bicarbonate).

Circular dichroism curve (solvent:ethanol).

$\Delta\epsilon=-0.068$ at 272 m$\mu$
$\Delta\epsilon=+3.37$ at 240 m$\mu$
$\Delta\epsilon=-6.68$ at 210 m$\mu$ The product is soluble in chloroform, ether and alcohols, and insoluble in water.

Analysis.—$C_{25}H_{27}N_3O_4S$; molecular weight=465.55. Calculated: C, 64.43%; H, 5.84%; N, 9.02%; S, 6.88%. Found: C, 64.4%; H, 6.1%; N, 9.2%; S, 6.9%.

As far as is known, this product is not described in the literature.

The starting product, 1(—)N-benzyl-1,2,3,4-tetrahydroisoquinaldinic acid, can be prepared as follows:

5 gm. of dl-N-benzyl-1,2,3,4-tetrahydroisoquinaldinic acid were introduced into 35 cc. of ethanol. The suspension thus obtained was heated to reflux. Then 5 cc. of 1(—)α-phenylethylamine were added. The resulting solution was allowed to stand at rest for about 2 hours. Then in vacuo, the precipitate thus formed was filtered, washed with ethanol, then dried.

The product thus obtained was purified by crystallization from ethanol in the presence of 1(—)α-phenylethylamine. The salt of 1(—)α-phenylethylamine and 1(—)N-benzyl-1,2,3,4-tetrahydroisoquinaldinic acid thus formed has a rotatory power of $[\alpha]_D^{20}=-92°\pm3°$ (c.=0.5% in pyridine).

As far as is known, this product is not described in the literature.

This salt was dissolved in 10 times it weight by volume of an aqueous N solution of sodium hydroxide. The resulting solution was extracted with methylene chloride. Then the aqueous phase was acidified by passage of sulfur dioxide therethrough. The precipitate thus formed was filtered in vacuo and, after washing this last in water and drying, 0.5 gm. of 1(—)N-benzyl-1,2,3,4-tetrahydroisoquinaldinic acid was obtained having a melting point of 218° C. and a specific rotation $[\alpha]_D^{20}=-130°$ (c.=0.5% in pyridine).

As far is known, this product is not described in the literature.

EXAMPLE V

The sodium salt of 6-(dl-N-benzyl-1',2',3',4'-tetrahydroisoquinolyl - 1'-carbonyl) - aminopenicillanic acid (I, with X=benzyl and Y=Na)

By neutralizing a hydroalcoholic solution of 6-(dl-N-benzyl - 1',2',3',4' - tetrahydroisoquinolyl - 1'-carbonyl)-aminopenicillanic acid with a decinormal aqueous solution of sodium hydroxide, the sodium salt of 6-(dl-N-benzyl - 1',2',3',4' - tetrahydroisoquinolyl - 1'-carbonyl)-aminopenicillanic acid is obtained, having a specific rotation $[\alpha]_D^{20}=+156°$ (c.=1% in water).

The infrared spectrum confirmed the structure.

The product is solvated with 4% water and is soluble in water, acetone and alcohol, and insoluble in ether, benzene and chloroform.

Analysis.—$C_{25}H_{26}N_3SO_4Na$; molecular weight=487.55. Calculated with 4% water: C, 59.12%; H, 5.61%; N, 8.27%; S, 6.32%; Na, 4.53%. Found: C, 58.9%; H, 5.2%; N, 8.4%; S, 6.8%; Na, 5.0%.

As far as is known, this product is not described in the literature.

EXAMPLE VI

6 - (dl - N - methyl - 1',2',3',4'-tetrahydroisoquinolyl-1'-carbonyl)-aminopenicillanic acid (I, with X=methyl and Y=H)

(A) FORMATION OF THE MIXED ANHYDRIDE OF ETHYL CARBONATE AND dl-N-METHYL-1,2,3,4-TETRAHYDROISOQUINALDINIC ACID (III$_A$, WITH X=METHYL AND Z=ETHYL

Operating as in Example I (Step A), starting from the hydrochloride of dl-N-methyl-1,2,3,4-tetrahydroisoquinaldinic acid, in acetone and in the presence of triethylamine, there was obtained by the action of ethyl chloroformate, a suspension of the mixed anhydride of ethyl carbonate and of dl-N-methyl-1,2,3,4-tetrahydroisoquinaldinic acid which was used as such in the following step.

As far as is known, this product is not described in the literature.

(B) CONDENSATION OF THE MIXED ANHYDRIDE WITH 6-AMINOPENICILLANIC ACID

Operating as in Example I (Step B), there is obtained by the action of 6-aminopenicillanic acid, dissolved in an aqueous solution containing 3 gm. per 100 cc. of sodium bicarbonate, with the suspension of the mixed anhydride prepared previously, 6-(dl-N-methyl-1',2',3,4'-tetrahydroisoquinolyl-1'-carbonyl) - aminopenicillanic acid.

The product is soluble in water, alcohol and chloroform. It melts at about 130° C. with decomposition.

Its rotatory power is $[\alpha]_D^{20} = +160°$ (c.=1% in chloroform).

Circular dichroism curve:
$\Delta\epsilon = +0.11$ at 315 m$\mu$
$\Delta\epsilon = +6.6$ at 235 m$\mu$ The product is solvated with 2.2% water.

Analysis.—$C_{19}H_{23}N_3SO_4$; molecular weight =389.46. Calculated with 2.2% water: C, 57.32%; H, 6.07%; N, 10.55%; S, 8.03%. Found: C, 57.7%; H, 6.5%; N, 10.4%; S, 7.9.

As far as is known, this product is not described in the literature.

The starting product, the hydrochloride of dl-N-methyl-1,2,3,4-tetrahydroisoquinaldinic acid, can be prepared as follows:

Stage 1.—Methyl ester of dl-1,2,3,4-tetrahydroisoquinaldinic acid.—dl-1,2,3,4-tetrahydroisoquinaldinic acid was treated with methanol in the presence of hydrochloric acid and the methyl ester of dl-1,2,3,4-tetrahydroisoquinaldinic acid was obtained, the picrate of which melts at 160° C. ± 3° C.

As far as is known, this product is not described in the literature.

Stage 2.—Methyl ester of dl-N-methyl-1,2,3,4-tetrahydroisoquinaldinic acid. The methyl ester of dl-1,2,3,4-tetrahydroisoquinaldinic acid was treated with methyl iodide, in the presence of ether and potassium carbonate. The methyl ester of dl-N-methyl - 1,2,3,4-tetrahydroisoquinaldinic acid was obtained, the picrate of which melts at 150° C.

As far as is known, this product is not described in the literature.

Stage 3.—dl-N-methyl-1,2,3,4-tetrahydroisoquinaldinic acid hydrochloride.—The methyl ester of dl-N-methyl-1,2,3,4-tetrahydroisoquinaldinic acid was treated with an aqueous normal solution of sodium hydroxide and dl-N-methyl-1,2,3,4-tetrahydroisoquinaldinic acid was obtained which was isolated by the action of hydrochloric acid, in the form of hydrochloride, melting point=270° C. (approximately).

As far as is known, this product is not described in the literature.

EXAMPLE VII 6-(dl-N-allyl-1',2',3',4' - tetrahydroisoquinolyl - 1'-carbonyl)-aminopenicillanic acid
(I, with X=CH$_2$—CH=CH$_2$ and Y=H)

(A) FORMATION OF THE MIXED ANHYDRIDE OF ETHYL CARBONATE AND OF dl-N-ALLYL-1,2,3,4-TETRAHYDROISOQUINALDINIC ACID
(III$_A$, WITH X=CH$_2$—CH=CH$_2$ AND Z=ETHYL)

Operating as in Example I (Step A), starting from the hydrochloride of dl-N-allyl - 1,2,3,4-tetrahydroisoquinaldinic acid, in acetone and in the presence of triethylamine, there was obtained by the action of ethyl chloroformate, a suspension of the mixed anhydride of ethyl carbonate and dl-N-allyl-1,2,3,4-tetrahydroisoquinaldinic acid, which was used as such in the following step.

As far as is known, this product is not described in the literature.

(B) CONDENSATION OF THE MIXED ANHYDRIDE WITH 6-AMINOPENICILLANIC ACID

Operating as in Example I (Step B), there was obtained by the action of 6-aminopenicillanic acid, dissolved in an aqueous solution containing 3 gm. per 100 cc. of sodium bicarbonate, with the suspension of mixed anhydride previously prepared, 6-(dl-N-allyl-1',2',3',4'-tetrahydroisoquinolyl-1'-carbonyl)-aminopenicillanic acid.

The product is soluble in alcohol, ether and chloroform, and slightly soluble in water.

It melts at about 130° C. with decomposition.

Its rotatory power is $[\alpha]_D^{20} = +167.5°$ (c.=1% in chloroform).

Circular dichroism curve:
$\Delta\epsilon = -0.08$ at 275 m$\mu$
$\Delta\epsilon = +8.71$ at 233 m$\mu$
$\Delta\epsilon = +13.8$ at 195 m$\mu$ The product is solvated with 2% water.

Analysis.—$C_{21}H_{25}N_3SO_4$; molecular weight =415.50. Calculated with 2% water: C, 59.50%; H, 6.15%; N, 9.91%; S, 7.5%. Found: C, 59.1%; H, 5.9%; N, 9.9%; S, 8.0%.

As far as is known, this product is not described in the literature.

The starting product, the hydrochloride of dl-N-allyl-1,2,3,4-tetrahydroisoquinaldinic acid, can be prepared as follows.

Stage 1.—Methyl ester of dl-N-allyl-1,2,3,4-tetrahydroisoquinaldinic acid.—The methyl ester of dl-1,2,3,4-tetrahydroisoquinaldinic acid (described in Example VI, Stage 1) was treated with allyl bromide, in the presence of ether and potassium carbonate. The methyl ester of dl-N-allyl-1,2,3,4-tetrahydroisoquinaldinic acid was obtained, the picrate of which melts at 123 to 125° C.

As far is known, this product is not described in the literature.

Stage 2.—dl - N - allyl-1,2,3,4-tetrahydroisoquinaldinic acid hydrochloride.—The methyl ester of dl-N-allyl-1,2,3, 4-tetrahydroisoquinaldinic acid was treated with an aqueous normal solution of sodium hydroxide and dl-N-allyl-1,2,3,4-tetrahydroisoquinaldinic acid was obtained, which was isolated, by the action of hydrochloric acid, in the form of hydrochloride, melting point=176° C.±2° C.

As far as is known, this product is not described in the literature.

By applying the methods described above, the following compounds of Formula I were prepared:

| Substituent X | Y | Configuration at 1' |
|---|---|---|
| $C_2H_5$ | H | dl |
| $CH_2CF_3$ | H | dl |
| $C_6H_5$ | H | dl |
| $CH_2CH_2C_6H_5$ | H | dl |

As far as is known, these compounds are not described in the literature.

As previously stated, the compounds of the general Formula I can be utilized in warm-blooded animals for the treatment of staphylocci infections such as staphylococcal septicemias, malignant staphylococcal infections of the face, cuatneous staphylococcal infections, pyodermatitis, septic or suppurating sores, anthrax, phlegmons, primary or post-influenzal acute staphylococcal infections, bronchopneumonia and pulmonary suppurations.

The compounds corresponding to the general Formula I are utilized orally, transcutaneously or locally by topic application to the skin and mucuous membranes.

These compounds can be prepared in the form of injectable solutions or suspensions, put up in ampules, in multiple-dose flacons, or prepared in the form of tablets, aromatized powders, pellets, syrups, suppositories, ovules, intravaginal tablets, ointments, creams, eye washes, nose or ear drops, gargles and topic powders in the form of pulverizations.

The useful dosology is controlled between about 3 mg./kg. and 20 mg./kg. per dose in the warm-blooded animal and 10 mg./kg. to 100 mg./kg. per day in the warm-blooded animal, or between 250 mg. and 1 gm. per dose and 1 gm. to 5 gm. per day for the adult, as a function of the method of administration.

The pharmaceutical forms, such as injectable solutions or suspensions, tablets, coated tablets, aromatized powders, pelelts, syrups, suppositories, ovules, intravaginal tablets, ointments, creams, eye washes, nose or ear drops, gargles and topic powders, are prepared according to the usual processes.

EXAMPLE VIII

Pharmacological study of the compunds of general Formula I (1) Antibacterial activity "in vitro."—The antibacterial activity was determined in a liquid media with respect to strains of Staphylococcus aureus, in comparison with the penicillin G. The minimum inhibitory concentrations (m.i.c.) expressed in γ/cc., were reported in Table I.

TABLE I

|  | 6-(dl-N-benzyl-1',2',3',4'-tetra-hydroisoquinolyl-1'-carbonyl)-amino-penicillanic acid | Penicillin G |
|---|---|---|
| Oxford strain (ATCC 209P) | 0.1 | 0.01 |
| Strain No. 1,128 (penicillin resistant) | 0.5–1.0 | 15.0 |

These results showed that the studied product, although less active than the penicillin G on the sensitive staphylococci, maintained, nevertheless, an interesting activity. In comparison with the penicillin resistant staphylococci, its activity was distinctly superior to that of the comparison product. Accordingly, the studied product resisted the action of the staphylococci penicillinase far better than penicillin G.

The minimum inhibitory concentration, with reference to Staphylococcus aureus No. 1,128, for the N-methylated derivative was 1 to 2.5 γ/cc. and for the N-allylated derivative was greater than 5 γ/cc. Therefore, these two compounds were uniformly more active than penicillin G.

(2) Activity "in vivo".—The therapeutic effect of 6-(dl-N-benzyl-1',2',3',4' - tetrahydroisoquinolyl - 1' - carbonyl)-aminopenicillanic acid was determined in experimental infections with staphylococci sensitive or resistant to penicillin G on mice, as compared with hexahydrobenzyloxy penicillin.

(A) INFECTIONS WITH PENICILLIN SENSITIVE STAPHYLOCOCCI (TIN STRAIN)

The antibiotics were orally administered immediately after the innoculations and 18 hours thereafter, at the same doses of 2 mg., 1 mg. and 0.5 mg.

The therapeutic effect obtained was the following as shown in Table II.

TABLE II

|  | Unitary doses per animal | | |
|---|---|---|---|
|  | 2 mg. | 1 mg. | 0.5 mg. |
| Studied product, percent | 100 | 92 | 61 |
| Hexahydrobenzyloxy penicillin, percent | 100 | 95 | 75 |

(B) INFECTIONS WITH PENICILLIN RESISTANT STAPHYLOCOCCI (BEN STRAIN)

Under the same test conditions as described above and at doses of 10 mg., 5 mg., and 3 mg., the following therapeutic effect was observed as shown in Table III.

TABLE III

|  | Unitary doses per animal | | |
|---|---|---|---|
|  | 10 mg. | 5 mg. | 3 mg |
| Studied product, percent | 80 | 40 | 30 |
| Hexahydrobenzyloxy penicillin, percent | 60 | 20 | 0 |

These results showed that the studied product was effective by oral administration in experimental infections with staphylococci in mice and that, even though its therapeutic activity was slightly inferior to that of hexahydrobenzyloxy penicillin with reference to penicillin sensitive staphylococci, it was definitely superior to that of the comparison product with respect to the penicillin resistant staphylococci.

(C) COMPARISON OF THE ACTIVITY WITH HEMISYNTHETIC PENICILLINS

The activity "in vivo" of the 6-(dl-N-benzyl-1',2',3',4'-tetrahydroisoquinolyl - 1' - carbonyl)-amino-penicillanic acid with respect to penicillin sensitive staphylococci (TIN strain) was determined by oral and subcutaneous administration, in experimental infections induced in mice, comparatively with "Cloxacillin," "Methicillin" and "Oxacillin."

The products were administered at doses of 1 mg. and 0.5 mg., either orally or subcutaneously.

The therapeutic effect observed was the following as shown in Table IV.

TABLE IV

|  | Oral administration | | Subcutaneous administration | |
|---|---|---|---|---|
|  | 1 mg. | 0.5 mg. | 1 mg. | 0.5 mg. |
| Product studied, percent | 88 | 53 | 72 | 42 |
| Cloxacillin, percent | 17 | 10 | 32 | 27 |
| Methicillin, percent | 32 | 17 | 65 | 20 |
| Oxacillin, percent | 44 | 15 | 70 | 36 |

According to the results, it was ascertained that the studied product was distinctly more active, administered orally in the infections with penicillin sensitive staphylococci than the comparison products. Subcutaneously administered, only Oxacillin exhibited an approximately equal activity.

The preceding specific embodiments are illustrative of the practice of the invention. It is to be understood, however, that other expedients known to those skilled in the art may be employed without departing from the spirit of the invention.

We claim:

1. A N-substituted 6-aminopenicillanic acid having the formula

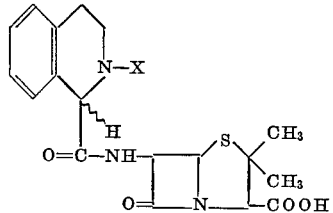

wherein X is selected from the group consisting of hydrogen, lower alkyl, fluoro-lower-alkyl, lower alkenyl, phenyl, phenyl - lower - alkyl and phenyl-lower-alkoxycarbonyl and the wavy line at the 1' position represents a steric configuration selected from the group consisting of the dextrorotatory isomer, the levorotatory isomer and mixtures thereof; and salts thereof with therapeutically-compatible bases selected from the group consisting of mineral bases and organic bases.

2. The compound of claim 1 wherein X is benzyl and the wavy line denotes a mixture of the $d$ and $l$ isomers.

3. The compound of claim 1 wherein X is benzyloxycarbonyl and the wavy line denotes a mixture of the $d$ and $l$ isomers.

4. The compound of claim 1 wherein X is hydrogen and the wavy line denotes a mixture of the $d$ and $l$ isomers.

5. The compound of claim 1 wherein X is benzyl and the wavy line denotes the $l$ isomer.

6. The sodium salt of the compound of claim 1 wherein X is benzyl and the wavy line denotes a mixture of the $d$ and the $l$ isomers.

7. The compound of claim 1 wherein X is methyl and the wavy line denotes a mixture of the $d$ and $l$ isomers.

8. The compound of claim 1 wherein X is allyl and the wavy line denotes a mixture of the $d$ and $l$ isomers.

9. A process for the production of a 6-(1',2',3',4'-tetrahydroisoquinolyl - 1' - carbonyl) - amino-penicillanic acid having the formula

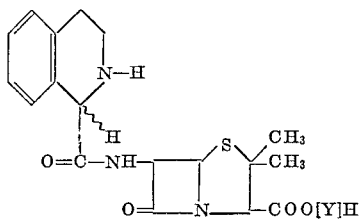

wherein the wavy line at the 1' position represents a steric configuration selected from the group consisting of the dextrorotatory isomer, and the levorotatory isomer and mixtures thereof, and salts thereof with therapeutically-compatible bases selected from the group consisting of mineral bases and organic bases, which comprises the steps of condensing 1,2,3,4-tetrahydroisoquinaldinic acid having the formula

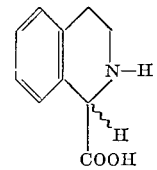

wherein the wavy line has the above-assigned values, with carbon oxychloride, reacting the resulting internal anhydride of the formula

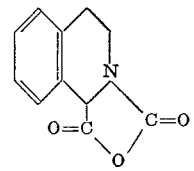

with 6-aminopenicillanic acid in the presence of a weakly acid medium, and recovering said 6-(1',2',3',4'-tetrahydro-isoquinolyl-1'-carbonyl)-aminopenicillanic acid.

10. The process of claim 9 wherein said condensing step with carbon oxychloride is conducted in an aprotic solvent.

References Cited

UNITED STATES PATENTS

| | | | |
|---|---|---|---|
| 3,043,831 | 7/1962 | Doyle et al. | 260—239.1 |
| 3,174,964 | 3/1965 | Hobbs et al. | 260—239.1 |

NICHOLAS S. RIZZO, Primary Examiner

U.S. Cl. X.R.

424—271